US012689820B2

United States Patent

Ihara

(10) Patent No.: US 12,689,820 B2

(45) Date of Patent: Jul. 21, 2026

(54) IMAGING APPARATUS INCLUDING EYEPIECE PORTION, METHOD FOR CONTROLLING IMAGING APPARATUS, AND RECORDING MEDIUM

(71) Applicant: CANON KABUSHIKI KAISHA, Tokyo (JP)

(72) Inventor: Kenta Ihara, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 32 days.

(21) Appl. No.: 18/393,342

(22) Filed: Dec. 21, 2023

(65) Prior Publication Data

US 2024/0129618 A1 Apr. 18, 2024

Related U.S. Application Data

(63) Continuation of application No. PCT/JP2022/024250, filed on Jun. 17, 2022.

(30) Foreign Application Priority Data

Jun. 24, 2021 (JP) ................................. 2021-104983

(51) Int. Cl.

| | |
|---|---|
| ***H04N 23/63*** | (2023.01) |
| ***H04N 23/53*** | (2023.01) |
| ***H04N 23/90*** | (2023.01) |

(52) U.S. Cl.

CPC ............. *H04N 23/63* (2023.01); *H04N 23/53* (2023.01); *H04N 23/90* (2023.01)

(58) Field of Classification Search

CPC ........ H04N 23/63; H04N 23/53; H04N 23/90; H04N 23/60; H04N 23/611; H04N 23/632;

(Continued)

(56) References Cited

U.S. PATENT DOCUMENTS 6,091,450 A * 7/2000 Hirasawa ............. H04N 23/531 348/333.01

2019/0007612 A1 * 1/2019 Hoshina ................... G09G 3/20

(Continued)

FOREIGN PATENT DOCUMENTS

CN 104205797 A 12/2014

CN 104735317 A 6/2015

(Continued)

*Primary Examiner* — Christopher K Peterson

(74) *Attorney, Agent, or Firm* — Canon U.S.A., Inc. IP Division

(57) ABSTRACT

An imaging apparatus includes a first imaging unit, a second imaging unit, an electronic viewfinder configured to display an image captured by the first imaging unit, and a determination unit configured to determine, based on image data captured by the second imaging unit, whether a user is attempting to view through the electronic viewfinder, wherein in a case where the determination unit does not determine that the user is attempting to view through the electronic viewfinder, the electronic viewfinder does not display the image captured by the first imaging unit, wherein in a case where the determination unit determines that the user is attempting to view through the electronic viewfinder, the electronic viewfinder displays the image captured by the first imaging unit, and wherein the determination unit uses a trained model in determining whether the user is attempting to view through the electronic viewfinder.

12 Claims, 7 Drawing Sheets

(58) Field of Classification Search
CPC .... H04N 23/633; H04N 23/64; H04N 23/651; H04N 23/667; H04N 23/45; G03B 13/02; G03B 17/02; G06N 20/00
See application file for complete search history.

(56) References Cited

U.S. PATENT DOCUMENTS

| | | | | |
|---|---|---|---|---|
| 2020/0053257 | A1 | 2/2020 | Sreepathihalli | |
| 2021/0006723 | A1 | 1/2021 | Ichihara | |
| 2021/0158022 | A1* | 5/2021 | Watanabe | H04N 23/675 |

FOREIGN PATENT DOCUMENTS

| | | | |
|---|---|---|---|
| JP | H09325260 | A | 12/1997 |
| JP | H104509 | A | 1/1998 |
| JP | 2013225785 | A | 10/2013 |
| JP | 2018189859 | A | 11/2018 |
| JP | 2019012349 | A | 1/2019 |
| JP | 2021012229 | A | 2/2021 |

* cited by examiner

LENS MOUNT SIDE

DISPLAY UNIT SIDE

IMAGING APPARATUS INCLUDING EYEPIECE PORTION, METHOD FOR CONTROLLING IMAGING APPARATUS, AND RECORDING MEDIUM

CROSS-REFERENCE TO RELATED APPLICATIONS

This application is a Continuation of International Patent Application No. PCT/JP2022/024250, filed Jun. 17, 2022, which claims the benefit of Japanese Patent Application No. 2021-104983, filed Jun. 24, 2021, both of which are hereby incorporated by reference herein in their entirety.

BACKGROUND OF THE INVENTION

Field of the Invention

The present invention relates to an imaging apparatus including an eyepiece portion.

Background Art

Imaging apparatuses that include an electronic viewfinder (EVF) have been known conventionally. In an imaging apparatus that includes an EVF, a proximity sensor is provided to determine whether a user is viewing through the EVF to detect an act of viewing through the EVF (eye proximity detection). The proximity sensor is a sensor for detecting the proximity of an object and does not guarantee that the user is actually viewing through the EVF. Thus, the sensor may erroneously detect eye proximity in a case where the user is hanging a strap of the camera around the neck or a camera is in contact with the body. Consequently, the EVF display continues, and power is consumed wastefully. Thus, Japanese Patent Application Laid-Open No. 2013-225785 discusses a configuration that uses a pressure sensor and performs control by switching a power-saving mode and a normal mode based on an output result of the pressure sensor.

CITATION LIST

Patent Literature

PTL 1: Japanese Patent Application Laid-Open No. 2013-225785

With the conventional technology discussed in Japanese Patent Application Laid-Open No. 2013-225785, however, the modes are simply switched based on the output result of the specific sensor, and whether what is actually detected matches an intended target is not determined. Therefore, there is still a possibility of excessive detection that leads to wasteful power consumption.

SUMMARY OF THE INVENTION

To achieve the above-described object, according to the present invention, an imaging apparatus includes a first imaging unit configured to image a subject, a second imaging unit arranged in a direction opposite to the first imaging unit, an electronic viewfinder arranged in the same direction as the second imaging unit and configured to display an image captured by the first imaging unit, and a determination unit configured to determine, based on image data captured by the second imaging unit, whether a user is attempting to view through the electronic viewfinder, wherein in a case where the determination unit does not determine that the user is attempting to view through the electronic viewfinder, the electronic viewfinder does not display the image captured by the first imaging unit, wherein in a case where the determination unit determines that the user is attempting to view through the electronic viewfinder, the electronic viewfinder displays the image captured by the first imaging unit, and wherein the determination unit uses a trained model in determining whether the user is attempting to view through the electronic viewfinder.

Further features of the present invention will become apparent from the following description of exemplary embodiments with reference to the attached drawings.

DESCRIPTION OF THE EMBODIMENTS

Exemplary embodiments of the present invention will be described in detail below with reference to the attached drawings.

It is to be noted that each exemplary embodiment described below is merely an example of implementation of the present invention and can be modified or changed as needed based on a configuration of an apparatus to which the present invention is applied or various conditions. Further, the exemplary embodiments can be combined as needed.

First Exemplary Embodiment

<Internal Configuration of Digital Camera 100>

Figure 1:
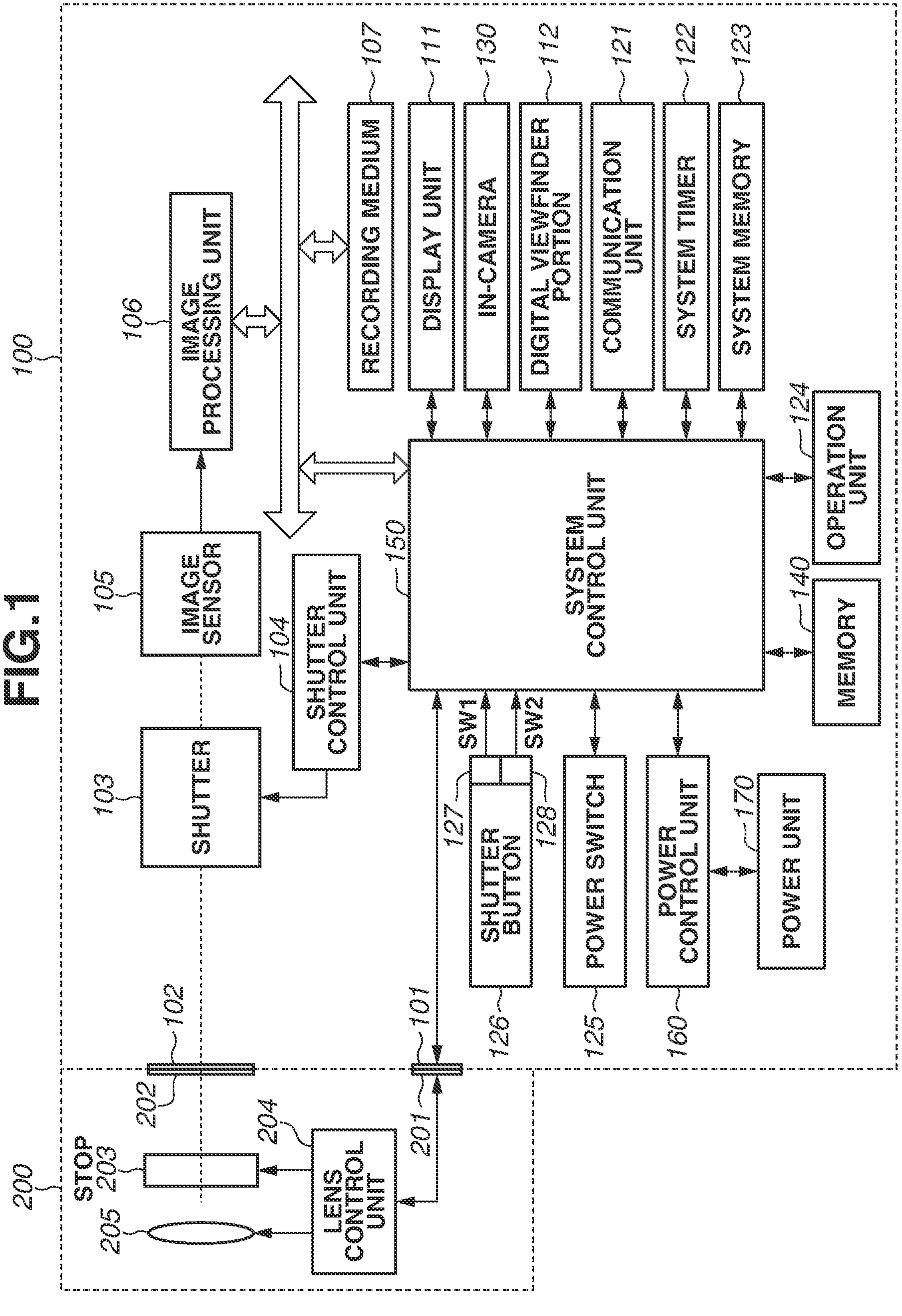
FIG. 1 is a block diagram illustrating a configuration of an imaging apparatus according to a first exemplary embodiment of the present invention.

FIG. 1 is a block diagram illustrating a configuration of a camera with an interchangeable lens unit as an exemplary embodiment of the present invention. In FIG. 1, an imaging apparatus includes a digital camera body 100 and an imaging lens 200. The imaging lens 200 guides incident light to an image sensor 105.

First, a configuration of the camera body 100 will be described below.

A shutter control unit 104 controls a shutter 103 based on exposure information from an image processing unit 106 in coordination with a lens control unit 204 configured to control a stop 203.

An optical image of a subject (not illustrated) is formed on the image sensor 105 through a lens 205, the stop 203, lens mounts 202 and 102, and the shutter 103, and the image sensor 105 converts the optical image into an electric signal.

The image processing unit 106 performs predetermined calculation processing on video signals input from the image sensor 105, performs image processing such as pixel interpolation processing, color conversion processing, and white balance processing on the video signals based on the calculation result, and outputs the resulting video signals to a display unit 111. Further, the resulting video signals are output to a digital viewfinder portion 112 in a case where eye proximity is detected based on images acquired by an in-camera 130. Further, the image processing unit 106 has a function of compressing images such as Joint Photographic Experts Group (JPEG) images. The display unit 111 is a display having a display area larger than the digital viewfinder portion 112.

A recording medium 107 is a removable memory such as a semiconductor memory for recording or reading image data.

A communication unit 121 is connected wirelessly or via a wired cable and transmits and receives video signals and audio signals. The communication unit 121 can be connected to a wireless local area network (wireless LAN) and the Internet. The communication unit 121 can transmit captured images (including through images) and images recorded in a recording circuit 107 and can receive image data and various types of other information from external devices.

An operation unit 124 is an operation unit that inputs various predetermined operation instructions to a system control unit 150. The operation unit is composed of one of a switch, a dial, a touch panel, pointing using line-of-sight detection, and a voice recognition apparatus or a combination thereof.

A system timer 122 measures a time for use in various controls and the time of a built-in clock.

A system memory 123 uses a random access memory (RAM). Constant numbers and variable numbers for operations of the system control unit 150 and programs read from a memory 140 are loaded into the system memory 123. Further, the system memory 123 also has a function of accumulating image data acquired by the in-camera 130.

A power switch 125 is used to switch and set a power-on mode and a power-off mode of an imaging apparatus 100.

A shutter button 126 is an operation unit for issuing imaging instructions.

A first shutter switch 127 is turned on in a case where the shutter button 126 of the imaging apparatus 100 is partially operated, i.e., half-pressed (imaging preparation instruction), and a first shutter switch signal SW1 is generated. The first shutter switch signal SW1 causes operations such as auto-focus processing, automatic exposure processing, auto white balance processing, and preliminary flash emission processing to be started.

A second shutter switch 128 is turned on in a case where the shutter button 126 is completely operated, i.e., fully-pressed (imaging instruction), and a second shutter switch signal SW2 is generated.

The system control unit 150 starts performing operations of an imaging process from the reading of a signal from the image sensor 105 to the writing of image data to the recording circuit 107 based on the second shutter switch signal SW2.

The in-camera 130 is a camera arranged to image a direction opposite to the image sensor 105.

The memory 140 is an electrically erasable and recordable non-volatile memory. For example, a read-only memory (ROM) is used. Constant numbers and programs for operations of the system control unit 150 are stored. The programs here refer to programs for performing various flowcharts described below according to the present exemplary embodiment.

The system control unit 150 is a control unit including at least one processor and controls operations of the entire imaging apparatus 100.

A power control unit 160 includes a battery detection circuit, a protection circuit, a direct-current (DC) to DC converter, and a Low Drop-Out (LDO) regulator. The power control unit 160 has a function of protecting a load circuit connected to a power circuit by deactivating a power source in a case where installation or uninstallation of a battery, a battery type, a battery level, or an overcurrent is detected. The power control unit 160 controls a power unit 170 based on instructions from the system control unit and supplies a specific power voltage to each component of the imaging apparatus 100 for a specific period.

The power unit 170 includes a primary battery such as an alkaline battery or a lithium battery, a secondary battery such as a nickel cadmium (NiCd) battery, a nickel-metal hydride (NiMH) battery, or a lithium ion (Li) battery, and an alternating current (AC) adapter.

The lens mounts 102 and 202 are interfaces for connecting the imaging apparatus 100 to a lens unit 200. Connectors 101 and 201 are connectors that electrically connect the imaging apparatus 100 to the lens unit 200 and are controlled by the system control unit 150.

The lens unit 200 is an interchangeable-lens type lens unit and guides an optical image of a subject (not illustrated) from the lens 205 through the stop 203, the lens mount 202 and 102, and the shutter 103 and forms the optical image on the image sensor 105.

Next, a configuration of the lens unit 200 will be described below.

The lens control unit 204 controls the entire lens unit 200. The lens control unit 204 has a function of a memory for storing constant numbers, variable numbers, and programs for operations and a function of a non-volatile memory for storing identification information such as a number specific to the lens unit 200, management information, function information such as an aperture stop value, a minimum stop value, and a focal length, and current and previous setting values. The lens control unit 204 is capable of performing auto-focus (AF) operations by controlling focusing of the lens 205 based on a focused state of an image measured by the image processing unit 106 and changing a position where the subject image having entered the image sensor 105 is formed. Further, the lens control unit 204 also has a function of controlling the stop 203 and a function of controlling zooming of the lens 205.

<Functions of Digital Camera 100>

Figure 2:
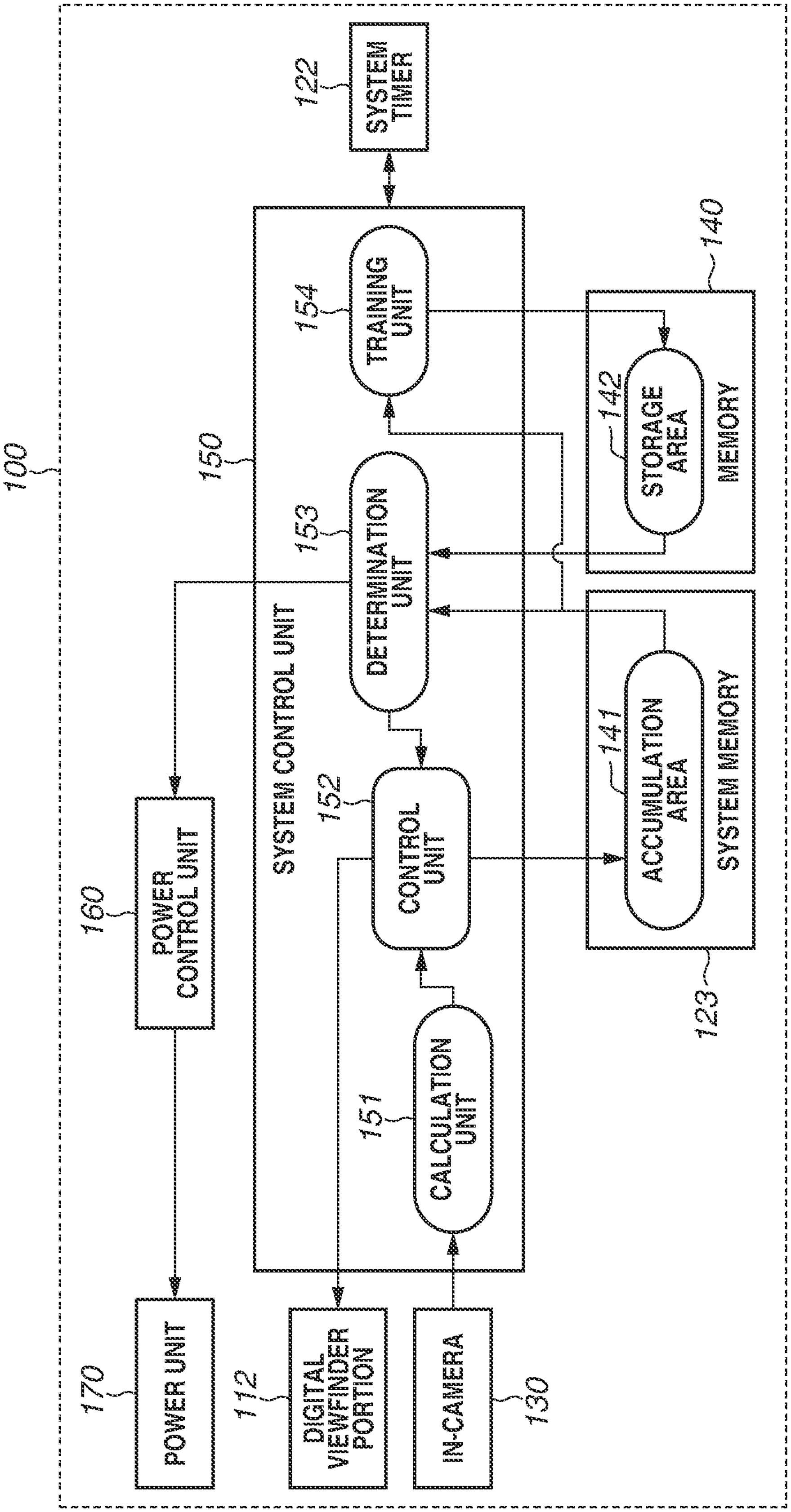
FIG. 2 is a diagram illustrating functions of the imaging apparatus according to the first exemplary embodiment of the present invention.

Next, functions of a digital camera 100 will be described below with reference to FIG. 2.

An accumulation area 141 of the system memory 123 is composed of a finite buffer. A storage area 142 of the memory 140 stores image data and a rule base associated with the image data. A determination unit 153 refers to the image data and the rule base in performing pattern matching on signals. A calculation unit 151 of the system control unit 150 outputs image data output from the in-camera 130 to a control unit 152 of the system control unit 150.

The control unit 152 of the system control unit 150 performs control to accumulate image data output from the in-camera 130 in the accumulation area 141 of the system memory 123 from the calculation unit 151.

Further, in a case where the determination unit 153 determines that eye proximity is detected, the digital viewfinder portion 112 is controlled, and outputting to the digital viewfinder portion 112 is performed. The determination unit 153 of the system control unit 150 performs pattern matching on a signal accumulated in the accumulation area 141 and image data stored in the storage area 142. Further, the determination unit 153 classifies image data accumulated in the accumulation area 141 as data representing that a user is viewing through the EVF or data representing that a user is not viewing through the EVF based on the rule base.

In a case where data is classified as data representing that a user is viewing through the EVF, a signal for making a transition to an EVF display mode is output to the power control unit 160 and the control unit 152.

The power control unit 160 and the control unit 152 make a transition to the EVF display mode based on the determination result from the determination unit 153.

A training unit 154 performs learning using image data stored in the storage area 142 as input and a flag indicating whether the corresponding user is viewing through the EVF or is not viewing through the EVF as training data. A trained model having finished the learning becomes an inference model that uses image data from the in-camera as input and outputs an inference that the user is viewing through the EVF or is not viewing through the EVF.

<External View of Digital Camera 100>

Figure 3A:
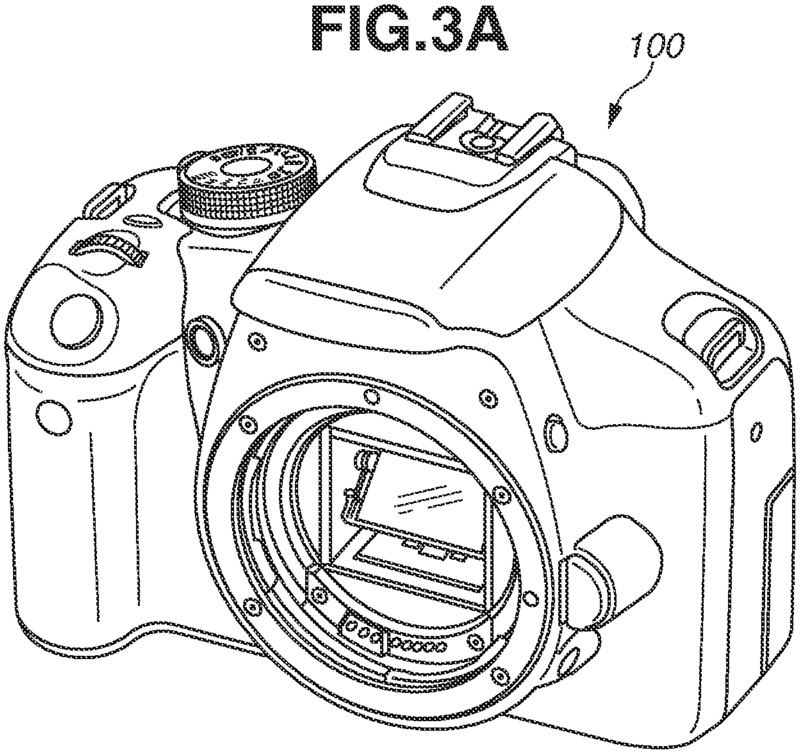
FIGS. 3A and 3B are diagrams illustrating external views of a lens mount side and a display unit side of the imaging apparatus according to the first exemplary embodiment of the present invention.
Figure 3B:
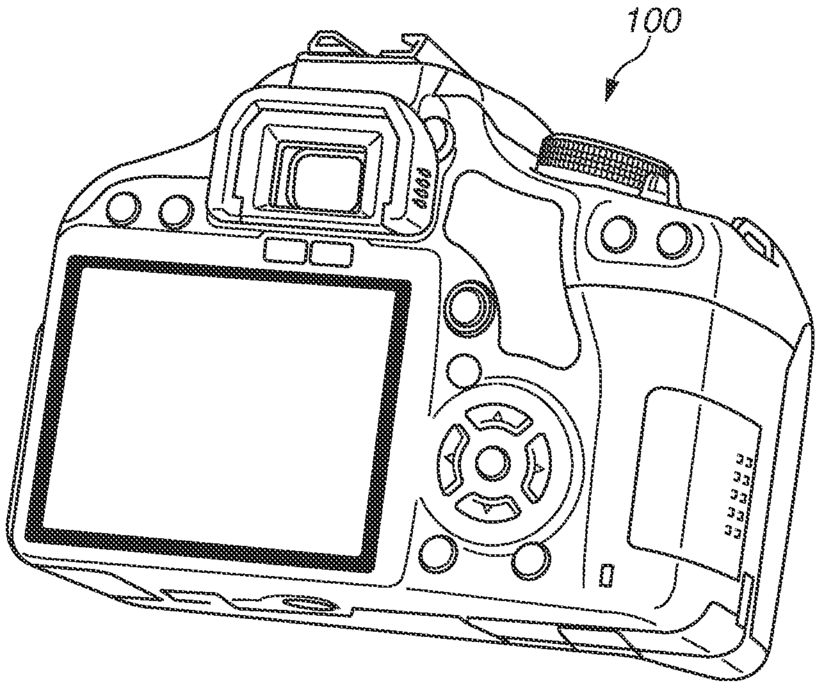

Next, a location where the in-camera 130 is placed will be described below with reference to FIGS. 3A and 3B. FIGS. 3A and 3B illustrate an example of a lens mount side and a display unit side of the imaging apparatus 100. The in-camera 130 is placed on the display unit side at a location where image data of the user can be acquired.

<Operations of Digital Camera 100>

Figure 4:
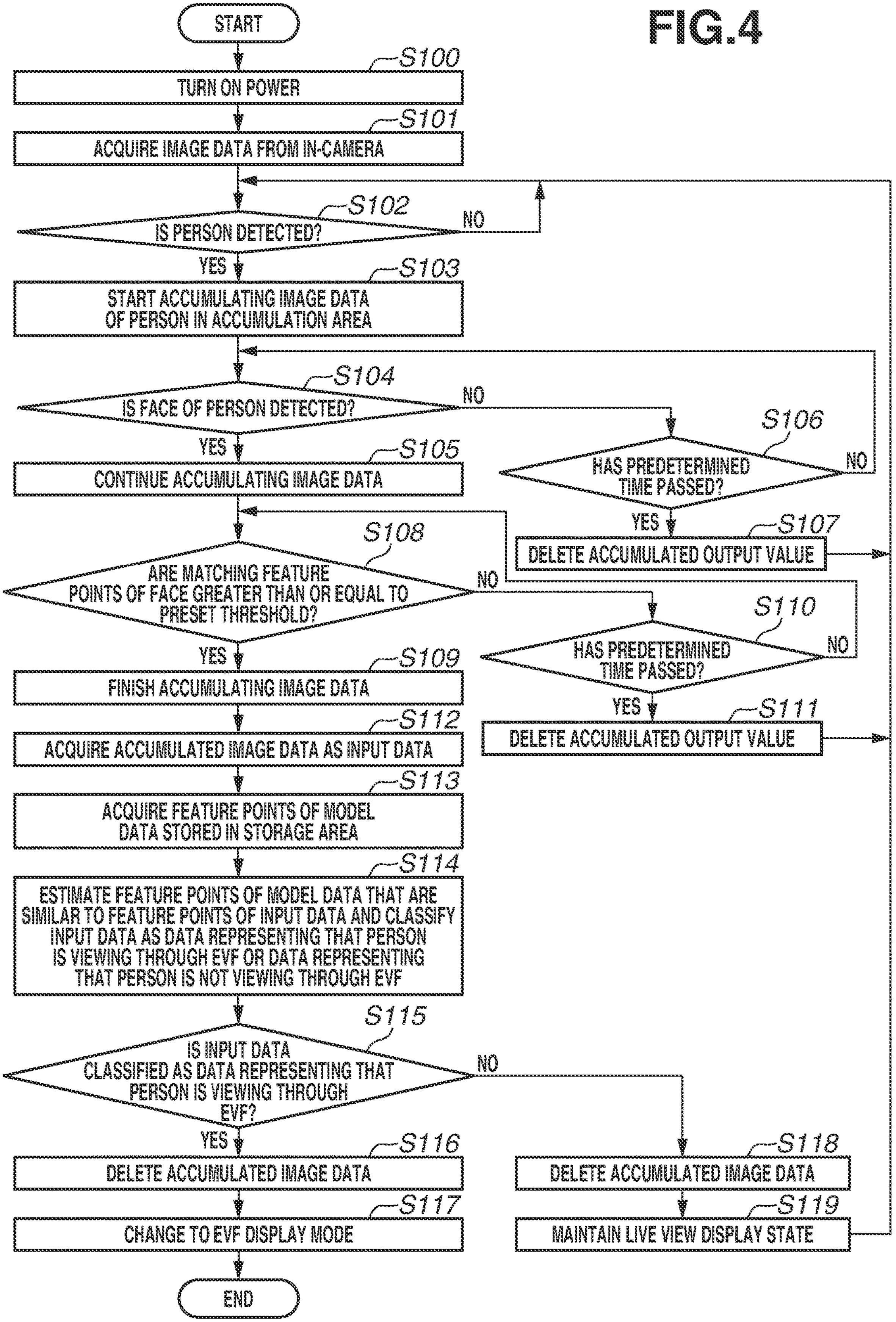
FIG. 4 is a flowchart illustrating operations of the imaging apparatus according to the first exemplary embodiment of the present invention.

A flowchart illustrating operations of the digital camera 100 will be described below with reference to FIG. 4. The flowchart starts in a case where the power switch 125 is turned on. Further, the system control unit 150 implements the flowchart by controlling the components of the digital camera 100. Unless otherwise specified, the system control unit 150 controls execution of each step of the flowchart described below.

In step S100, power is supplied to the components of the imaging apparatus 100, and the imaging apparatus 100 changes to a power-on state.

In step S101, the in-camera 130 is activated, and image data is acquired.

In step S102, the control unit 152 of the system control unit 150 performs person detection by setting a threshold for feature points of a person from the image data acquired in step S101 and determining whether matching feature points are greater than or equal to the preset threshold. In a case where a person is detected, the processing proceeds to step S103. On the other hand, in a case where no person is detected, step S102 is repeated.

In step S103, the control unit 152 of the system control unit 150 starts accumulating image data of the in-camera 130 in the accumulation area 141 of the system memory 123.

In step S104, the control unit 152 of the system control unit 150 performs detection by setting a threshold for feature points of a face of the person from the image data and determining whether matching feature points are greater than or equal to the preset threshold. In a case where the face of the person is detected, the processing proceeds to step S105. On the other hand, in a case where the face of the person is not detected, the processing proceeds to step S106.

In step S105, the control unit 152 of the system control unit 150 continues accumulating the image data of the in-camera 130 in the accumulation area 141 of the system memory 123.

In step S106, the control unit 152 of the system control unit 150 determines whether a predetermined time has passed since the detection of the person in step S102, using the system timer 122. In a case where the control unit 152 determines that the predetermined time has passed, the processing proceeds to step S107. On the other hand, in a case where the control unit 152 determines that the predetermined time has not passed, step S104 is repeated.

In step S107, signals accumulated in the accumulation area 141 of the system memory 123 are deleted.

In step S108, the control unit 152 of the system control unit 150 sets a threshold range and determines whether matching feature points of the face are greater than or equal to the preset threshold. In a case where the threshold is met or exceeded, the processing proceeds to step S109.

In step S110, the control unit 152 of the system control unit 150 determines whether a predetermined time has passed since the detection of the feature points of the face in step S108, using the system timer 122.

In a case where the control unit 152 determines that the predetermined time has passed, the processing proceeds to step S111. On the other hand, in a case where the control unit 152 determines that the predetermined time has not passed, step S108 is repeated.

In step S109, the control unit 152 of the system control unit 150 finishes accumulating the image data of the in-camera 130 in the accumulation area 141 of the system memory 123.

In step S112, the determination unit 153 of the system control unit 150 acquires, as input data, signals accumulated in the accumulation area 141 of the system memory 123.

In step S113, the determination unit 153 of the system control unit 150 acquires, as model data, signals stored in the storage area 142 of the memory 140.

In step S114, the determination unit 153 of the system control unit 150 performs pattern matching on the input data and the model data and classifies the input data as data representing that the person is viewing through the EVF or data representing that the person is not viewing through the EVF, based on the rule base.

In step S115, the determination unit 153 of the system control unit 150 determines whether the input data is classified as data representing that the person is viewing through the EVF or data representing that the person is not viewing through the EVF, based on the result in step S114. In a case where the determination unit 153 determines that the input data is classified as data representing that the person is viewing through the EVF, the processing proceeds to step S116. On the other hand, in a case where the determination unit 153 determines that the input data is classified as data representing that the person is not viewing through the EVF, the processing proceeds to step S118.

In step S116, signals accumulated in the accumulation area 141 of the system memory 123 are deleted.

In step S117, the power control unit 160 controls the power unit 170 and the digital viewfinder portion 112 based on an EVF display mode instruction.

In step S118, signals accumulated in the accumulation area 141 of the system memory 123 are deleted.

In step S119, the display on the display unit 111 is maintained, and the processing returns to step S102.

<Learning of Digital Camera 100>

Figure 5:
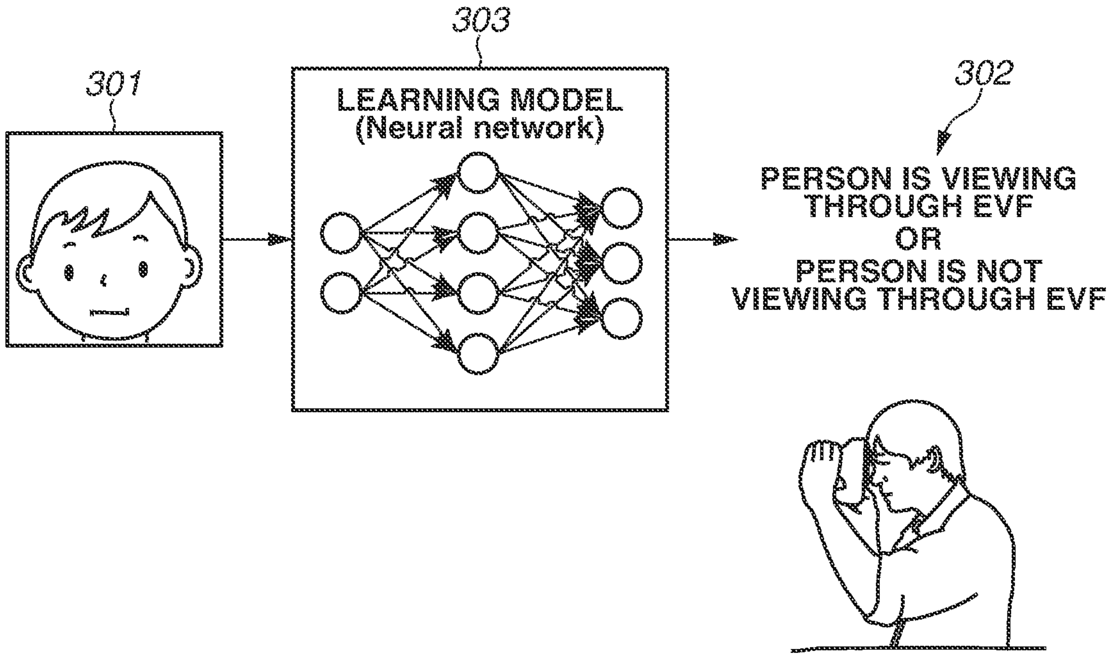
FIG. 5 is a conceptual diagram illustrating a configuration using a learning model of the imaging apparatus according to the first exemplary embodiment of the present invention.

Next, a technique for appropriate EVF display by determining whether the user is viewing through the EVF using a learning model in a case where the person is detected will be described below. FIG. 5 is a conceptual diagram illustrating an input/output configuration using a learning model according to the present exemplary embodiment. Input data 301 is input data. The input data 301 is collected by accumulating image data of the in-camera 130 in the accumulation area 141 of the system memory 123 in steps S103 to S109 in FIG. 4.

Output data 302 has two types, data representing that the person is viewing through the EVF and data representing that the person is not viewing through the EVF. A learning model is constructed using differences of combinations of changes in the image data of the in-camera 130 as feature points, and input data is classified.

A learning model 303 is a learning model. Specific algorithms of machine learning are nearest neighbors methods, Naive Bayes methods, Decision Tree, and Support Vector Machine. Another specific algorithm is Deep Learning, which generates feature amounts and coupling weight coefficients for learning on its own using neural networks. Any of the above-described algorithms that can be used can be applied to the present exemplary embodiment as needed.

Figure 6:
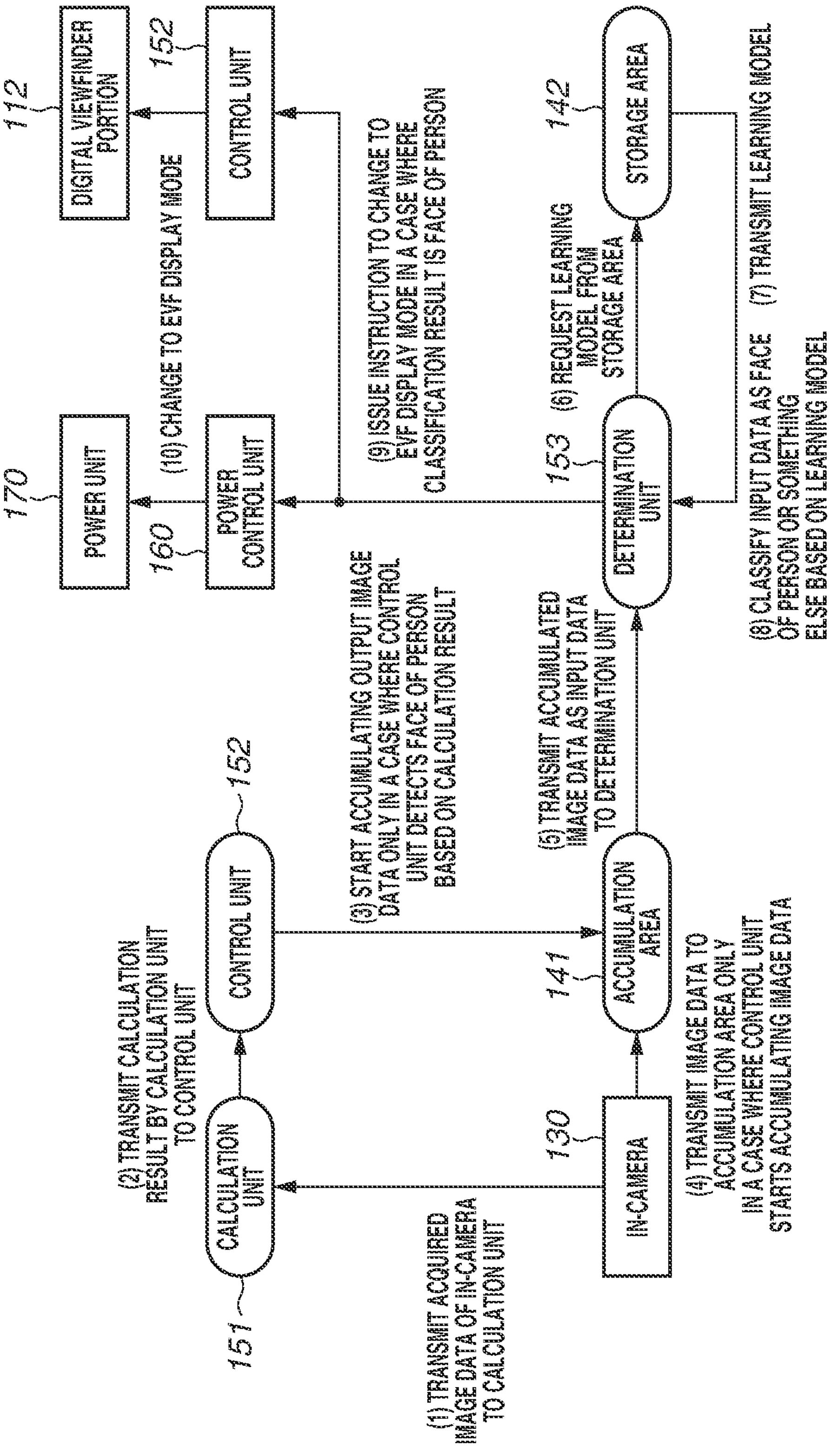
FIG. 6 is a diagram illustrating system operations according to the first exemplary embodiment of the present invention.

FIG. 6 illustrates operations of a system to which the present invention using the configuration illustrated in FIG. 5 is applicable. Use of the learning model makes it possible to classify data as data representing that the person is viewing through the EVF or data representing that the person is not viewing through the EVF, making it possible to make a transition to the EVF display mode only in a case where data is data representing that the person is viewing through the EVF.

Acquired image data of the in-camera 130 is transmitted to the calculation unit 151. A calculation result by the calculation unit 151 is transmitted to the control unit 152. In a case where the control unit 152 starts accumulation, the image data is transmitted to the accumulation area 141. The accumulated image data is transmitted as input data to the determination unit 153. A learning model is requested from the storage area 142.

The learning model is transmitted from the storage area 142 to the determination unit 153. The determination unit 153 classifies, based on the learning model, the input data as data representing a face of a person or something else. In a case where the classification result by the determination unit 153 is a face of a person, an instruction to change to the EVF display mode is issued to the power control unit 160 and the control unit 152. The power control unit 160 controls the power unit 170, and the control unit 152 controls the digital viewfinder display unit 112, whereby a transition to the EVF display mode is made.

Further, the training unit 154 can include an error detection unit and an update unit. The error detection unit obtains an error between model data and output data output from an output layer of a neural network based on input data input to an input layer. The error detection unit can calculate an error between the output data from the neural network and the model data using a loss function.

The update unit updates coupling weight coefficients between nodes of neural networks based on errors obtained by the error detection unit to reduce the errors. The update unit updates the coupling weight coefficients using, for example, a backpropagation method. The backpropagation method is a method for adjusting coupling weight coefficients between nodes of each neural network to reduce the above-described errors.

Figure 7:
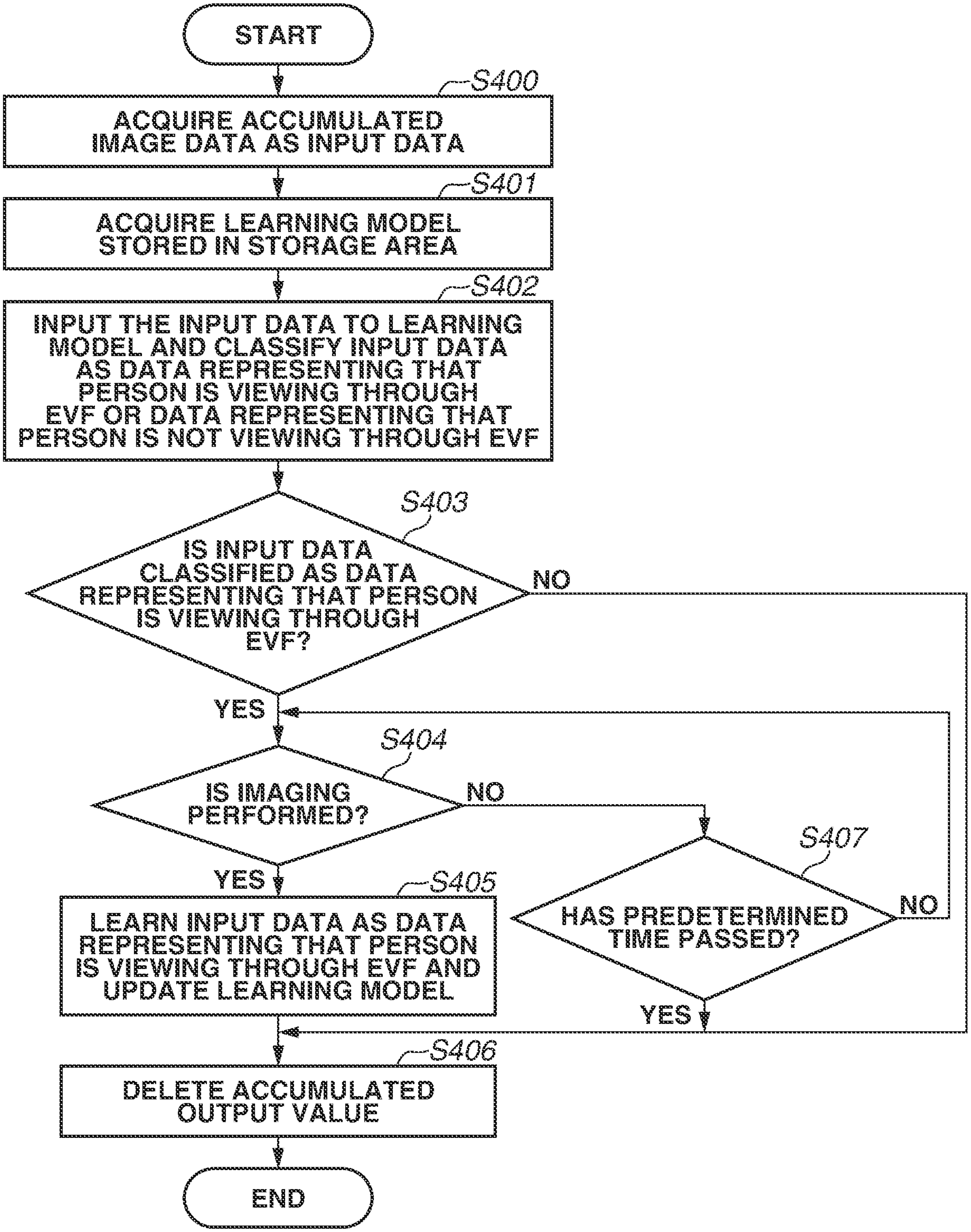
FIG. 7 is a flowchart illustrating a learning phase of the imaging apparatus according to the first exemplary embodiment of the present invention.

A flowchart will be described below with reference to FIG. 7 in which after data is classified as data representing that the person is viewing through the EVF or data representing that the person is not viewing through the EVF, error detection is performed based on whether a predetermined imaging operation is performed by the user within a predetermined time, and the learning model is updated by relearning in a case where an error occurs.

In step S400, the determination unit 153 of the system control unit 150 acquires signals accumulated in the accumulation area 141 of the system memory 123 as the input data 301.

In step S401, the determination unit 153 of the system control unit 150 acquires the learning model 303 stored in the storage area 142 of the memory 140.

In step S402, the determination unit 153 of the system control unit 150 inputs the input data 301 to the learning model 303 and classifies the input data 301 as data representing that the person is viewing through the EVF or data representing that the person is not viewing through the EVF.

In step S403, the determination unit 153 of the system control unit 150 determines whether the output data in step S402 is data representing that the person is viewing through the EVF. In a case where the determination unit 153 determines that the output data is classified as data representing that the person is viewing through the EVF, the processing proceeds to step S404. On the other hand, in a case where the determination unit 153 determines that the output data is not classified as data representing that the person is viewing through the EVF, the processing proceeds to step S406. In step S406, signals accumulated in the accumulation area 141 of the system memory 123 are deleted.

In step S404, the determination unit 153 of the system control unit 150 determines whether an operation is performed by the user based on signals from the operation unit 124. In a case where the determination unit 153 determines that an operation is performed, the processing proceeds to step S405. On the other hand, in a case where the determination unit 153 determines that no operation is performed, the processing proceeds to step S407.

In step S405, the training unit 154 of the system control unit 150 relearns the input data 301 as data representing that the person is viewing through the EVF and updates the learning model 303.

In step S406, signals accumulated in the accumulation area 141 of the system memory 123 are deleted.

In step S407, the determination unit 153 of the system control unit 150 determines whether a predetermined time has passed since the determination that the data is classified as data representing that the person is viewing through the EVF in step S403, using the system timer 122. In a case where the determination unit 153 determines that the predetermined time has passed, the processing proceeds to step S406. On the other hand, in a case where the determination unit 153 determines that the predetermined time has not passed, step S404 is repeated.

In step S406, signals accumulated in the accumulation area 141 of the system memory 123 are deleted.

As described above, image data of the in-camera 130 at a time at which the user views through the EVF is classified as data representing that the person is viewing through the EVF or data representing that the person is not viewing through the EVF by performing pattern matching on the image data and the model data, and a transition to the EVF display mode is made only in a case where the image data is classified as data representing that the person is viewing through the EVF.

Furthermore, the inclusion of the training unit 154 makes it possible to consider unique habits and behaviors of each user that are not applied to the pattern matching, and as the number of times of use increases, the classification accuracy improves, making it possible to make a transition to the EVF display mode without erroneous detection.

While the imaging apparatuses are described as an example according to the present exemplary embodiment, the present invention is not limited to those described above. The present invention is applicable to any imaging apparatus capable of determining whether a person is viewing through the EVF, regardless of its form.

While exemplary embodiments of the present invention have been described above, the present invention is not limited to the exemplary embodiments, and various modifications and changes can be made within the spirit of the present invention.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention reduces wasteful power consumption by an electronic viewfinder (EVF).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus comprising:

a first imaging unit configured to image a subject;

a second imaging unit arranged in a direction opposite to the first imaging unit;

an electronic viewfinder arranged in the same direction as the second imaging unit and configured to display an image captured by the first imaging unit;

a detector configured to detect a face out of image data captured by the second imaging unit;

a determination unit configured to determine, based on image data captured by the second imaging unit, whether a user is attempting to view through the electronic viewfinder; and a controller, wherein the controller is configured to (i) in a case where the face is not detected by the detector, control the determination unit not to perform the determination, and control the electronic viewfinder not to display an image captured by the first imaging unit, (ii) in a case where the face is detected by the detector and the face detected by the detector satisfies a predetermined condition, control the determination unit to perform the determination, and (a) in a case where the determination unit does not determine that the user is attempting to view through the electronic viewfinder, control the electronic viewfinder not to display the image captured by the first imaging unit, and (b) in a case where the determination unit determines that the user is attempting to view through the electronic viewfinder, control the electronic viewfinder to display the image captured by the first imaging unit, and wherein the determination unit uses a trained model in determining whether the user is attempting to view through the electronic viewfinder.

2. The imaging apparatus according to claim 1, further comprising a display unit having a display area larger than the electronic viewfinder, wherein in a case where the determination unit does not determine that the user is attempting to view through the electronic viewfinder, the controller controls the display unit to display the image captured by the first imaging unit, and wherein in a case where the determination unit determines that the user is attempting to view through the electronic viewfinder, the controller controls the display unit not to display the image captured by the first imaging unit.

3. The imaging apparatus according to claim 1, wherein in a case where processing for imaging using the first imaging unit and recording image data is performed before a predetermined time passes after the determination unit determines that the user is attempting to view through the electronic viewfinder, the trained model is relearned using, as input data, image data used by the determination unit in determining that the user is attempting to view through the electronic viewfinder and, as training data, information indicating that the user is attempting to view through the electronic viewfinder.

4. The imaging apparatus according to claim 1, wherein the detector detects feature points of the face from the image data captured by the second imaging unit, and upon satisfying the predetermined condition by the feature points detected by the detector, the controller controls the determination unit to perform the determination.

5. The imaging apparatus according to claim 1, further comprising:

an accumulator configured to accumulate the image data captured by the second imaging unit since detecting the face by the detector till satisfying the predetermined condition, wherein based on the captured image data accumulated by the accumulator, the determination unit determines whether the user is attempting to view through the electronic viewfinder.

6. The imaging apparatus according to claim 5, wherein the detector is capable of detecting a person, and upon detecting the person by the detector, the accumulator starts the accumulation of the image data captured by the second capturing unit.

7. The imaging apparatus according to claim 6, wherein the accumulator deletes the accumulated image data when a predetermined time has elapsed without detecting a face of the person by the detector after detecting the person by the detector.

8. The imaging apparatus according to claim 5, wherein the accumulator deletes the accumulated image data when a predetermined time has elapsed without satisfying the predetermined condition after detecting the face by the detector.

9. A method for controlling an imaging apparatus including a first imaging unit configured to image a subject, a second imaging unit arranged in a direction opposite to the first imaging unit, and an electronic viewfinder arranged in the same direction as the second imaging unit and configured to display an image captured by the first imaging unit, and a detector configured to detect a face out of image data captured by the second imaging unit, the method comprising:

determining, based on the image data captured by the second imaging unit, whether a user is attempting to view through the electronic viewfinder; and controlling a controller wherein the controller is configured to (i) in a case where the face is not detected by the detector and the face detected by the detector satisfies a predetermined condition, control the determination unit not to perform the determination, and control the electronic viewfinder not to display an image captured by the first imaging unit, (ii) in a case where the face is detected by the detector, control the determination unit to perform the determination, and (a) in a case where the determining does not determine that the user is attempting to view through the electronic viewfinder, the image captured by the first imaging unit is not displayed on the electronic viewfinder, (b) in a case where the determining determines that the user is attempting to view through the electronic viewfinder, control is performed to display the image captured by the first imaging unit on the electronic viewfinder, and wherein the determining uses a trained model in determining whether the user is attempting to view through the electronic viewfinder.

10. The method for controlling the imaging apparatus according to claim 9, wherein the imaging apparatus further includes a display unit having a display area larger than the electronic viewfinder, wherein in a case where the determining does not determine that the user is attempting to view through the electronic viewfinder, the image captured by the first imaging unit is displayed on the display unit, and wherein in a case where the determining determines that the user is attempting to view through the electronic viewfinder, the image captured by the first imaging unit is not displayed on the display unit.

11. The method for controlling the imaging apparatus according to claim 9, wherein in a case where processing for imaging using the first imaging unit and recording image data is performed before a predetermined time passes after the determining determines that the user is attempting to view through the electronic viewfinder, the trained model is relearned using, as input data, image data used in determining that the user is attempting to view through the electronic viewfinder and, as training data, information indicating that the user is attempting to view through the electronic viewfinder.

12. A non-transitory computer-readable storage medium which stores a program for causing an imaging apparatus including a first imaging unit configured to image a subject, a second imaging unit arranged in a direction opposite to the first imaging unit, and an electronic viewfinder arranged in the same direction as the second imaging unit and configured to display an image captured by the first imaging unit, to execute the method according to claim 9.

* * * * *